United States Patent Office 3,308,138
Patented Mar. 7, 1967

3,308,138
CYCLOPROPA-ANDROSTENE COMPOUNDS
Peter John Palmer, Twickenham, England, assignor to Parke, Davis & Company, Detroit, Mich., a corporation of Michigan
No Drawing. Filed Jan. 15, 1965, Ser. No. 425,928
Claims priority, application Great Britain, Feb. 4, 1964, 4,774/64
8 Claims. (Cl. 260—397.5)

This invention relates to novel chemical compounds and means for producing the same. More particularly, the invention relates to cyclopropa-[2α,3α]-androst-4-ene compounds represented by the formula:

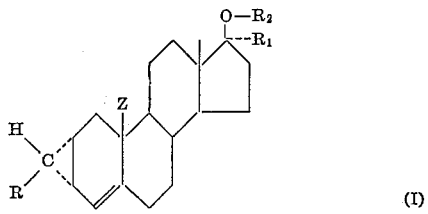

where (1) Z is hydrogen or a methyl group and R, $R_1$ and $R_2$ represent hydrogen atoms or (2) Z is a methyl group, R is hydrogen or a methyl group, $R_1$ is a methyl group and $R_2$ is hydrogen or a lower alkanoyl group of not more than four carbon atoms, preferably an acetyl group.

In accordance with the invention, cyclopropa-[2α,3α]-androst-4-en-17β-ol compounds of Formula I are produced by reacting the corresponding 2-methylene-androst-4-en-3-one compounds of formula:

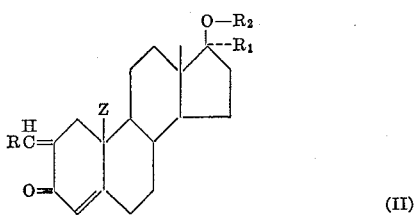

with hydrazine under basic conditions in the presence of a hydroxylic organic solvent; where Z, R, $R_1$ and $R_2$ have the above-specified significance. At least one equivalent, and preferably an excess, of hydrazine or hydrazine-yielding substance such as hydrazine hydrate, is employed for the reaction; and in the special case where $R_2$ of the starting material is an alkanoyl group, at least two equivalents of hydrazine are employed. As basic agents for the reaction, one may use an alkali metal, an alkali metal hydroxide or an alkali metal alkoxide. Sodium metal, which forms a salt with the hydroxylic solvent, is preferred. Examples of some of various suitable solvents are ethylene glycol, diethylene glycol, benzyl alcohol, triethylene glycol and 2-phenylethanol. Ordinarily the reaction is carried out at temperatures in the approximate range from 150 to 250° C. At 150° C. the reaction is complete in about 24 hours, whereas at 250° C. about 2–3 hours are required for completion. Preferably, the reaction is run at 180° C. for one-half hour and then at 210° C. for four hours.

Also in accordance with the invention, cyclopropa-[2α, 3α]-androst-4-ene compounds of Formula I where Z and $R_1$ are methyl groups, R is hydrogen or a methyl group, and $R_2$ is a lower alkanoyl group are produced by reacting the corresponding 17α-methylcyclopropa-[2α,3α]-androst-4-en-17β-ol of formula:

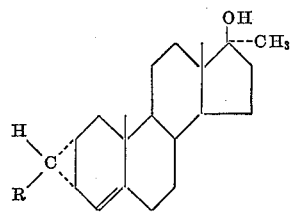

with at least one equivalent of an acylating agent, such as an acyl halide or an acid anhydride, derived from an organic acid containing not more than four carbon atoms; where R has the above-specified significance.

Conveniently, the acylation is acomplished by reaction with an acyl halide or an acid anhydride or in two steps by reaction with a lower alkyl Grignard reagent and subsequent reaction of the resulting Grignard compound with an acyl halide. The acylation with acyl halide is carried out with a tertiary amine catalyst such as pyridine or triethylamine at temperatures in the range from 0 to 100° C. for periods from about 2 to 24 hours, preferably from 20 to 30° C. for 14 to 18 hours. The tertiary amine can serve as a solvent or an inert solvent such as diethyl ether or benzene may be used. Acyl halides containing not more than four carbon atoms such as acetyl chloride or propionyl chloride are employed for the reaction. The acylation with acid anhydride is carried out with or without catalyst (tertiary amine catalyst such as pyridine or triethylamine) at temperatures in the range from 20 to 150° C. for one to 18 hours, preferably from 115 to 140° C. for two hours. As a solvent, one may use excess anhydride or a tertiary amine or inert solvent such as benzene or diethyl ether. The acylation with Grignard reagent and acyl halide is carried out in an inert solvent such as diethyl ether or tetrahydrofuran at temperatures in the range from 0 to 50° C. for one to 18 hours, preferably at 25 to 35° C. for 24 to 48 hours.

The compounds of the invention possess useful pharmacological properties. In particular, when administered by the oral or parenteral routes the compounds exhibit significant myotropic activity yet have relatively low androgenic side effects; hence, they have application as anabolic agents. The compounds are also useful as intermediates for the production of other steroids. Preferred anabolic agents of the invention are 17α-methylcyclopropa-[2α,3α]-androst-4-en-17β-ol and cyclopropa-[2α, 3α]-19-norandrost-4-en-17β-ol.

The invention is illustrated by the following examples.

*Example 1*

Anhydrous hydrazine is distilled into a hot solution of 2 g. of sodium in 100 ml. of diethylene glycol until the solution refluxes freely at an internal temperature of 180° C. 2-methylene-17α-methyl-17β-hydroxy-androst-4-en-3-one (4 g.) is added and the resulting solution heated at reflux under nitrogen for 30 minutes. The internal temperature is increased to 210° C. and excess hydrazine removed by distillation, and refluxing is then continued for 4 hours. The reaction mixture is cooled to room temperature and diluted with 500 ml. of water. The mixture is extracted with two 50-ml. portions of ether and the combined ether extract washed with water, dried and the ether removed by evaporation. The residual product is 17α-methylcyclopropa-[2α,3α]-androst-4-en-17β-ol; M.P. 121–123° C., following purification by adsorption on an alumina column (neutral alumina, Woelm, activity grade III) elution with benzene, and crystallization from acetone.

The product can also be prepared by the following procedure: hydrazine hydrate (10 ml.) is added to 150 ml. of diethylene glycol and the solution heated under nitrogen to 180° C. 2-methylene-17α-methyl-17β-hydroxyandrost-4-en-3-one (5 g.) is added and the solution is heated at reflux for 30 minutes. A solution of sodium (2 g.) in diethylene glycol (50 ml.) is added. The reaction temperature is increased to 210° C. and excess hydrazine hydrate removed by distillation. The solution is then heated at reflux for 4 hours and finally is cooled and poured into 500 ml. of water. The product isolated, 17α-methylcyclopropa-[2α,3α]-androst-4-en-17β-ol, is isolated from the resulting mixture in the same manner described above: by concentration, adsorption and elution, and crystallization from acetone.

Example 2

A solution of 1.0 g. of 17α-methylcyclopropa-[2α,3α]-androst-4-en-17β-ol in 5 ml. of pyridine and 5 ml. of acetic anhydride is heated at reflux for 3 hours, then cooled and poured into 50 ml. of water. The mixture is extracted with two 25-ml. portions of ether. The combined ether extract is washed in turn with dilute hydrochloric acid, water, aqueous sodium bicarbonate, water, and then dried and concentrated by evaporation of the ether. The residual product is 17α-methylcyclopropa-[2α,3α]-androst-4-en-17β-ol, acetate ester; M.P. 78–80° C. after crystallization from acetone. When a propionyl halide such as propionyl chloride is substituted for the acetic anhydride in this procedure, the product is 17α-methylcyclopropa[2α,3α]-androst-4-en-17β-ol, propionate ester. Likewise, when the procedure is carried out with equivalent amounts of acetic anhydride and the corresponding 2a-methyl methylcyclopropa-androstenol, the resulting product is 17α-methyl-2a-methylcyclopropa-[2α,3α]-androst-4-en-17β-ol, acetate ester.

Example 3

A solution of 10 ml. of hydrazine hydrate in 150 ml. of diethylene glycol is heated under nitrogen to 180° C. 2-methylene-17β-hydroxyandrost-4-en-3-one (5 g.) is added, with stirring, and the solution is heated at reflux for 30 minutes. A solution of 2.0 g. of sodium in 50 ml. of diethylene glycol is added, and the temperature is increased to 210° C. and the excess hydrazine removed by distillation. The residual mixture is heated at reflux for 4 hours and is then cooled and poured into 500 ml. of water. The mixture is extracted with two 100-ml. portions of ether. The combined ether extract is washed with water, dried and concentrated by removal of ether. The residual product is cyclopropa-[2α,3α]-androst-4-en-17β-ol; M.P. 103–105° C., after adsorption on alumina, elution with benzene, and evaporation of the eluate.

To produce the corresponding norandrostene compound the same procedure is followed except that 19-nor-2-methylene-17β-hydroxyandrost-4-en-3-one (5 g.) is substituted for the 2-methylene-17β-hydroxyandrost-4-en-3-one. The residual product remaining after removal of ether from the extract is the desired cyclopropa-[2α,3α]-19-norandrost-4-en-17β-ol; B.P., 160° C./0.5 mm.

Example 4

2-ethylidene17α-methyltestosterone (4.29 g.) is added to a stirred solution of 10 ml. of hydrazine hydrate in 150 ml. of diethylene glycol at 180° C. The temperature is maintained at 180° C. for 30 minutes, a solution of 2.0 g. of sodium in 50 ml. of diethylene glycol is added and the temperature is increased to 210° C. and excess hydrazine hydrate removed. The reaction mixture is refluxed at about 210° C. for 4 hours and is then cooled and poured into water. The product which precipitates is collected by filtration, washed with water and dissolved in ether. The ether solution is washed with water, dried and the ether removed by evaporation. The residual product, 17α - methyl - 2a - methyl - cyclopropa - [2α,3α] - androst-4-en-17β-ol, is purified by adsorption on alumina, elution with benzene-petroleum ether and removal of the eluant; M.P. 157–158° C. after crystallization first from benzene-n-hexane and then from benzene.

The starting material is prepared from 17α-methyltestosterone, as follows: 10 ml. of diethyl oxalate and 3.23 g. of a 50% sodium hydride dispersion in mineral oil are added to a stirred solution of 20 g. of 17α-methyltestosterone in 270 ml. of benzene. One ml. of methanol is added, and the mixture is stirred at 25° C. for 2 hours and is then diluted with ether. The product which separates, the sodium sat of 2-ethyloxalyl-17α-methyltestosterone, is removed by filtration, washed with ether and dried. The salt is dissolved in 200 ml. of water, and 13 ml. of acetaldehyde is added to the resulting solution after cooling to 0 to 5° C. After standing 30 minutes, 5 g. of potassium carbonate is added and the clear solution allowed to stand 16 hours at 25° C. The mixture is extracted with several portions of ether. The combined ether extract is washed in turn with water, aqueous sodium bicarbonate and water, then dried and evaporated. The residual product, 2-ethylidene-17α-methyltestosterone, is purified by adsorption on alumina (600 g. of Spence H deactivated with 30 g. of 10% aqueous acetic acid), elution with benzene, evaporation of the eluate, and crystallization from acetone; M.P. 184–187° C.

I claim:
1. A member of the group consisting of cyclopropa-[2α,3α] - androst-4-en-17β-ol, cyclopropa-[2α,3α]-19-norandrost-4-en-17β-ol and cyclopropa-[2α,3α]-androst-4-ene compounds of the formula:

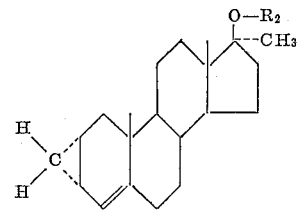

where R is a member of the group consisting of hydrogen and methyl, and $R_2$ is a member of the group consisting of hydrogen and lower alkanoyl.

2. 17α - methylcyclopropa - [2α,3α] - androst - 4 - en-17β-ol.
3. 17α-methylcyclopropa - [2α,3α] - androst - 4 - en-17β-ol, acetate ester.
4. Cyclopropa-[2α,3α]-androst-4-en-17β-ol.
5. Cyclopropa-[2α,3α]-19-norandrost-4-en-17β-ol.
6. Process of producing cyclopropa-[2α,3α]-androst-4-en-17β-ol compounds which comprises reacting a 2-methylene-androst-4-en-3-one compound of formula:

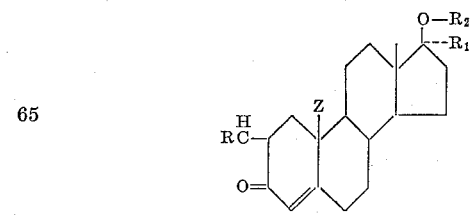

with at least one equivalent of hydrazine in a hydroxylic organic solvent in the presence of a basic agent; where Z, R, $R_1$ and $R_2$ represent values in one of the three following combinations; Z, R, $R_1$ and $R_2$ represent hydrogen atoms; Z is a methyl group and R, $R_1$ and $R_2$ represent hydrogen atoms; and Z is a methyl group, R is one of hydrogen and methyl, $R_1$ represents a methyl group and $R_2$ is one of hydrogen and lower alkanoyl.

7. Process according to claim 6 where the basic agent is sodium and the reaction is carried out at temperatures in the range from 180 to 210° C.

8. Process according to claims 6 and 7 where $R_2$ is a lower alkanoyl group and at least two equivalents of hydrazine are employed.

References Cited by the Examiner

Lowenthal: Tetrahedron, vol. 6, No. 4, pp. 269-303 (1959), pp. 299-301.

ELBERT L. ROBERTS, *Primary Examiner.*

HENRY A. FRENCH, *Examiner.*